Figure 1:
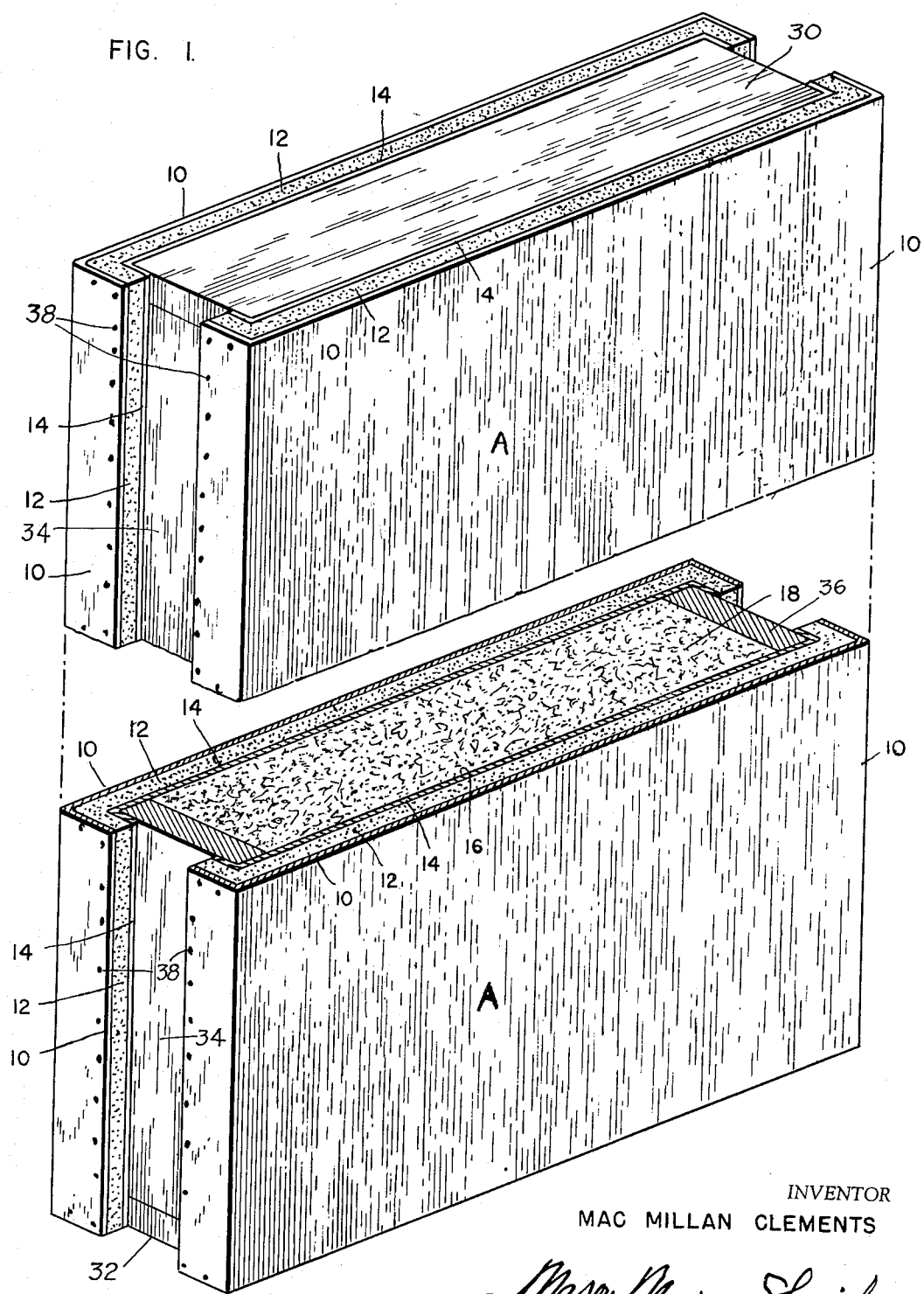

July 31, 1956     MacMILLAN CLEMENTS     2,757,116
STRUCTURAL PANEL AND METHOD OF MAKING SAME
Filed April 8, 1953

INVENTOR
MAC MILLAN CLEMENTS

ATTORNEYS

July 31, 1956     MacMILLAN CLEMENTS     2,757,116
STRUCTURAL PANEL AND METHOD OF MAKING SAME
Filed April 8, 1953

2 Sheets-Sheet 2

INVENTOR
MAC MILLAN CLEMENTS

ATTORNEYS

United States Patent Office 2,757,116
Patented July 31, 1956

2,757,116

STRUCTURAL PANEL AND METHOD OF MAKING SAME

MacMillan Clements, Bethel, Conn.

Application April 8, 1953, Serial No. 347,532

2 Claims. (Cl. 154—118)

This invention relates to the method of making a structural panel and is particularly directed to the making of a panel that will eliminate the separation of the metallic and non-metallic layers before and during the use of the panel as a part of a building structure.

An object of the invention, therefore, is to provide a method of making a panel wherein the several bonded layers thereof will remain rigidly fastened to each other under all conditions and for an indefinite length of time.

A further object of the invention is to provide a method of constructing a building panel which eliminates some of the steps of preparing the metal layer before bonding to the nonmetallic layer.

Another object of the invention is to provide a method of bonding the several layers of a building panel wherein the metallic and non-metallic layers are bonded to each other and where the glue line has relatively permanent elasticity, but no elastic limit.

Yet another object of the invention relates to the steps of a method of making a structural panel which will, during use, resist the combined effect of frost and vapor pressure.

Other objects will appear hereinafter throughout the specification.

Figure 2:
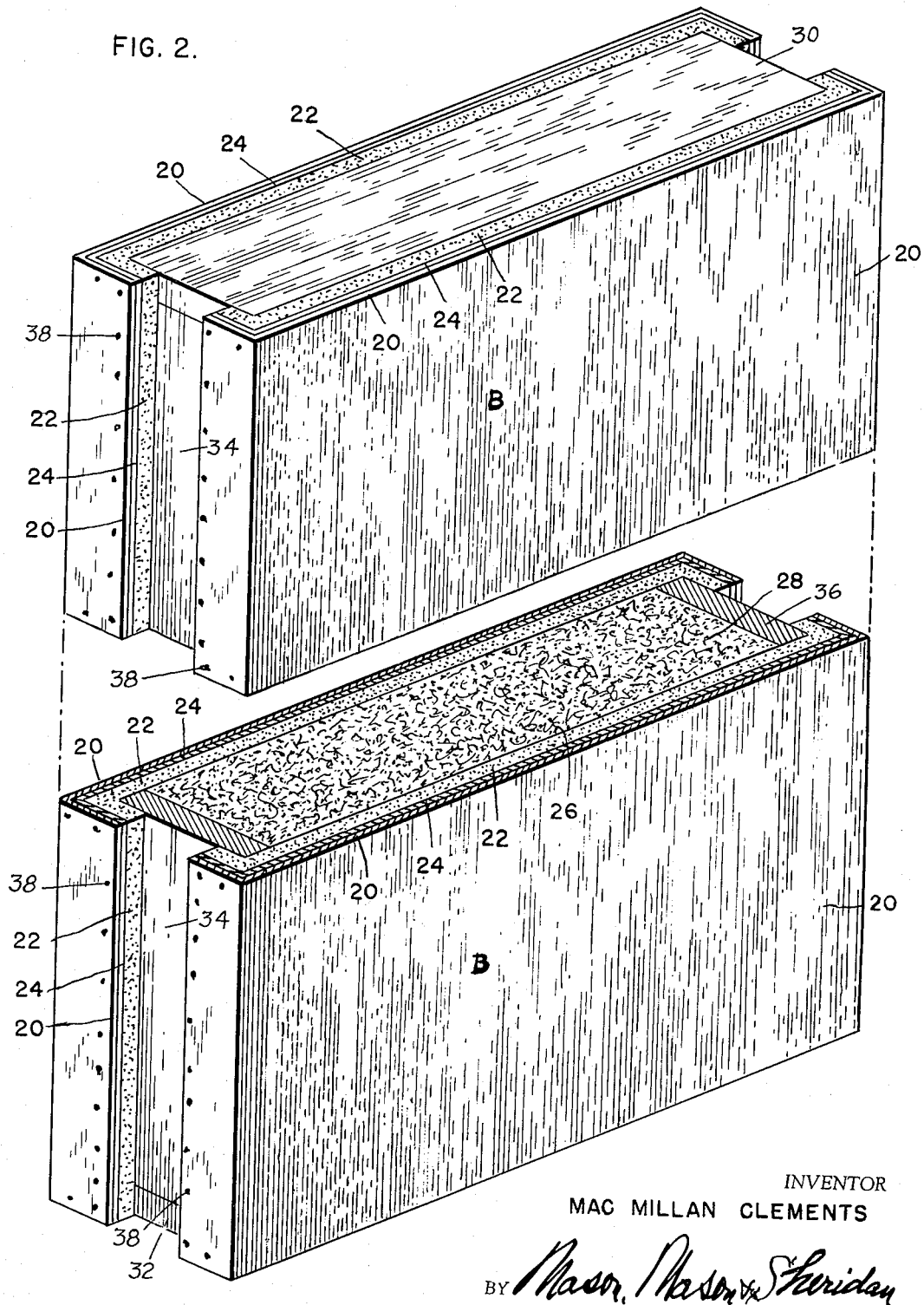

In the drawings:

Figure 1 shows in vertical section and partly broken away, a panel made in accordance with the preferred method, and Figure 2 is a view similar to Figure 1, showing a panel constructed in accordance with a modified method.

The delamination of the metallic skin such as the aluminum sheet and the sheet of organic fibre or mineral material, i. e., the separation of the metallic and non-metallic layers which have been bonded to each other, can be prevented, provided the steps of the present process are followed.

Delamination may be the result of one or more of the following causes:

(1) Too high a finish of the bonding surface of the aluminum or metallic coil as it comes from the factory which, when cut to shape, forms the skin of the panel. An aluminum surface having a high finish is harder to clean and otherwise prepare for application of the glue or other adhesive for bonding the skin to the non-metallic layer. Moreover, such a highly finished surface does not lend itself readily to the bonding of the metallic layer with the non-metallic layer which consists of structural material such as plywood, hardboard or asbestos board.

(2) The use of a comparatively heavy guage of skin metal and/or a metal of comparatively high temper. Either or both of these conditions reduce the glue line shear stress.

(3) The combined effect of frost and vapor pressure before and during actual use of the panel, particularly where low temperatures are prevalent.

In the present invention, the process consists in bonding aluminum or stainless steel sheets having a commercial dull finish as in utility sheets. Such metal sheets should be supplied in de-greased coils. Such coils are of metal that is of low gauge and temper.

The use of a commercial dull finished sheet or coils in place of the higher finished ones materially increases the adhesive qualities of the metal skin surface. Moreover, such dull finished surface metal is easier to clean preparatory to the bonding operation.

The metal coil or sheet should be of low gauge and temper which will increase the glue line shear stress.

The present invention contemplates the use of aluminum foil or sheet up to .015 gauge half hard Al which appears to be right on the borderline but which, under some circumstances, may meet minimum requirements.

Preferably, and in order to secure a comfortable margin of safety, the metal skin will be about .012 gauge dead soft Al,, or lower, except for such work hardening that has been induced by the embossing operation.

The use of such metallic skin material will greatly increase the bonding action between the same and the non-metallic layer, whether this layer be of hardboard, or of other organic fibre, or of mineral material.

An unpredictable cause of bond failure which occurs after the structures have been completed and during actual use, is the combined effect of frost and vapor pressure. This failure can develop in an improperly vented building, and can gradually work into a panel between the bonded surfaces thereof. As a positive guard against this type of failure, a layer of metal foil of reasonably impervious thickness is laminated to the inside faces of the panel. The use of such foil layer not only prevents de-lamination by the combined effect of frost and vapor pressure, but also increases the thermal efficiency to such an extent that the additional cost is offset. Such foil layer will increase the stability of the panel surfaces.

The present method includes the following steps:

(1) The preparation of the aluminum or stainless steel sheet or skin forming the outer layer of the panel by (a) Providing a metal coil whose hardness does not exceed .015 half hard and which preferably is a dull finish grained material of about .012 dead soft.

(b) The uniting or bonding of said metallic skin by means of glue or other adhesive to a non-metallic organic fibre, or mineral wool sheet.

The making of a panel of pairs of laminated sheets into a panel is shown and described, for instance in my Patent 2,629,140, February 24, 1953, by adding a framework and providing a space between the laminated sheets which will be filled with insulating material. It will be understood, however, that the structure shown in my patent represents only one of the forms of panel to which this invention may apply.

Although not needed under all conditions, I prefer to add a lining, by laminating a layer of metal foil of reasonably impervious thickness to the inside faces of the non-metallic sheets. It will be understood that only one foil sheet may be used and that said foil sheet or sheets may be located between the metallic and non-metallic layers instead of being bonded to the inside face of the non-metallic layer, i. e., either or both of them, both forms being illustrated in Figures 1 and 2.

Referring to Figure 1 of the drawings which illustrates one form of the invention, A indicates the panel as a whole, and 10 the sheets of metal forming the skin. Either or both of these is of aluminum or other metal such as stainless steel, or each skin may be composed of bi-metallic material, i. e., metal sheets welded to each other. Said skin or sheet should not exceed a gauge of .015 half hard and preferably, it consists of grain, dull finished material of a gauge of .012 dead soft except for such work hardening that has been induced by the embossing operation. Each sheet is united by bonding to the non-metallic sheet 12 which is of organic material or of mineral fibre.

On the interior faces of the non-metallic sheets, I affix, preferably by bonding, foil layers of reasonably impervious thickness indicated by the numeral 14, and within the space 16 defined by each laminated sheet, I provide insulating material 18 which may consist of mineral or vegetable fibres. If mineral fibres are used, fibre glass may be the insulating material.

In the form shown in Figure 2, B indicates the panel as a whole and 20 the metallic skins, 22 the non-metallic sheets. Interposed between these sheets and the metallic skins is a layer of foil 24 of substantially impervious thickness which is bonded to the inside surface of the metallic skins 20 and the outside surface of the non-metallic sheets 22.

A space 26 is provided between the laminated sheets in which is located the insulating material 28. It will be understood that only one layer of foil may be provided in place of the two layers shown in the construction shown in either Figures 1 or 2. Moreover, it is within the scope of the present invention to locate a foil sheet in other positions than the position shown in Figures 1 and 2. For instance, I may attach the sheet 14 to the inside surface of the non-metallic sheet, and between the outside surface of this sheet and the inside surface of the metallic skin, a second layer of foil may be used. Alternately, the foil may be used on the inside of the non-metallic sheet of one of the laminated sheets as in Figure 1, and between the metallic skin and non-metallic sheet of the other laminated sheet as in Figure 2.

As in my Patent 2,629,140, mentioned above, the panel of this application comprises a rectangular frame or framework which comprises an upper frame member 30, a lower frame member 32, and vertically disposed frame members 35 and 36 arranged between and secured to the ends of the upper and lower frame members. As clearly shown in Figures 1 and 2, the laminated sheets are secured to the frame members by nails or similar securing means 38.

The above description and drawings disclose several embodiments of the invention, as specific language has been employed in describing the several figures. It will, nevertheless, be understood that no limitations of the scope of the invention are thereby contemplated, and that various alterations and modifications may be made such as would occur to one skilled in the art to which the invention relates.

Having thus described the invention, what is claimed as new and what is believed to be secured for Letters Patent is:

1. A method of making a panel for use in building construction and refrigerators comprising the steps of providing an outer skin of metallic material between about .015 gauge half hard to about .012 gauge dead soft, providing a substantially rigid non-metallic layer and a layer of metallic foil, said layers and said skin being substantially coextensive bonding said skin and said layer of metallic foil to opposite side faces of said non-metallic layer to form a laminated sheet, assembling a pair of said sheets in fixed spaced parallel relation with the layers of metallic foil facing each other, and filling the space between said sheets with an insulating material.

2. A panel for use in building construction and refrigerators comprising a frame having a first pair and a second pair of opposite faces, two sheets of laminated material, one of said laminated sheets extending across each of said first pair of opposite faces of said frame so as to form with said frame an enclosed space, each of said laminated sheets of material being of a larger area than the area defined by said frame over which they extend, two opposite edges of each of said laminated sheets extending beyond opposite side edges of said frame and forming right angle flanges which overlap said second pair of opposite faces on said frame, means for attaching said flanges to said frame, each laminated sheet comprising an outer metallic layer, an inner metallic layer, and a substantially rigid non-metallic layer between and bonded to said metallic layers with the inner metallic layer in contact with said frame, said layers being substantially coextensive and said enclosed space being filled with insulating material.

References Cited in the file of this patent
UNITED STATES PATENTS

| | | |
|---|---|---|
| 1,626,655 | Woodson | May 3, 1927 |
| 1,967,611 | Finck | July 24, 1934 |
| 2,009,056 | Schaffert | July 23, 1935 |
| 2,019,233 | Nicol | Oct. 29, 1935 |
| 2,070,330 | Chase | Feb. 9, 1937 |
| 2,164,143 | Munters | June 27, 1939 |
| 2,172,048 | Johnson | Sept. 5, 1939 |
| 2,629,140 | Clements | Feb. 24, 1953 |
| 2,662,043 | Clements | Dec. 8, 1953 |